May 19, 1936. H. H. BOURN 2,041,044
HARNESS ATTACHMENT
Filed June 24, 1935 2 Sheets-Sheet 2

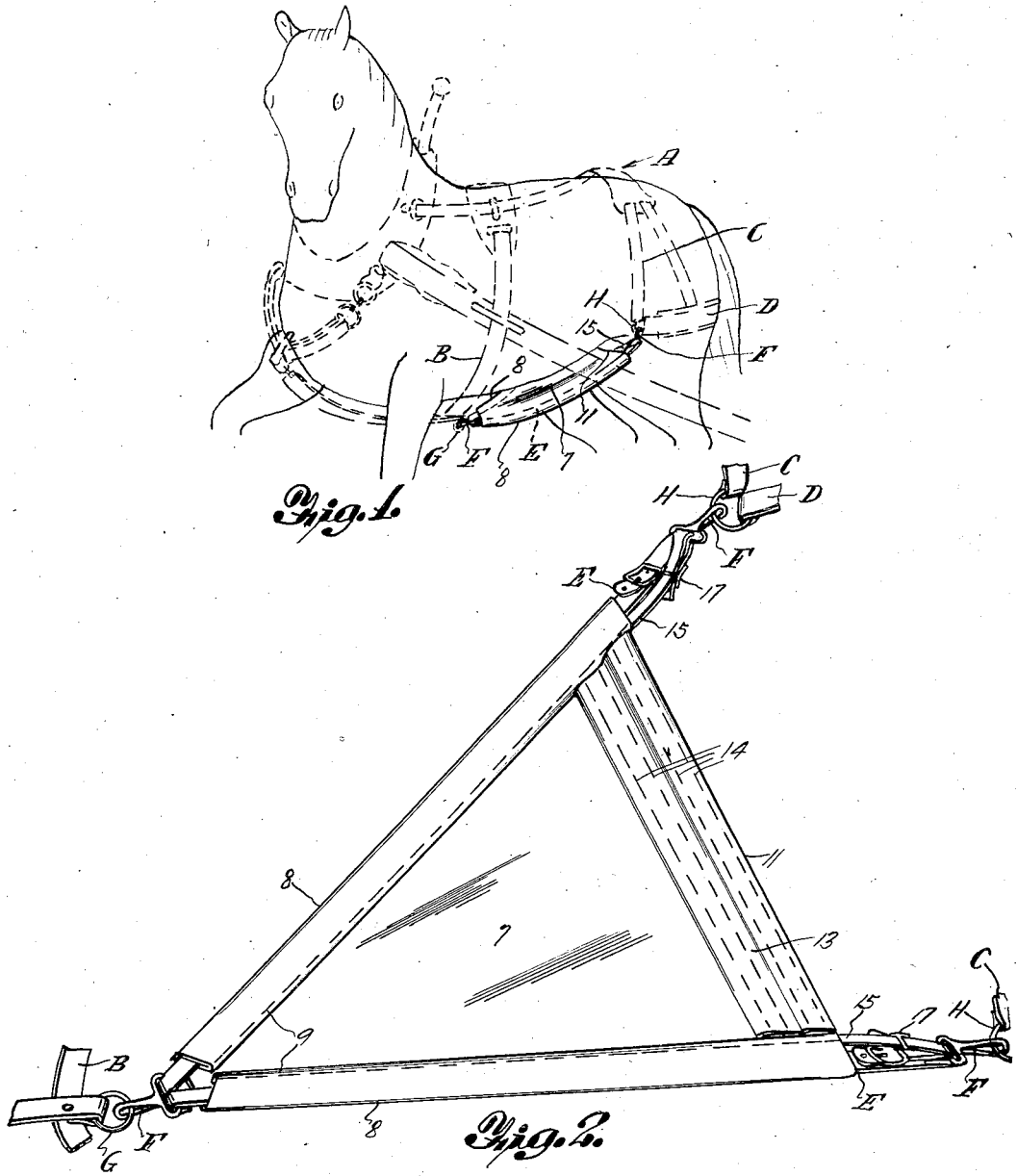

INVENTOR
HARRY H. BOURN
By Adam E. Fisher
ATTORNEY

Patented May 19, 1936

2,041,044

UNITED STATES PATENT OFFICE 2,041,044

HARNESS ATTACHMENT

Harry H. Bourn, Waukesha, Wis.

Application June 24, 1935, Serial No. 28,071

3 Claims. (Cl. 54—1)

My invention relates to harness attachments for horse or mule harness.

In the type of harness known as breeching harness there are included two side straps which, meeting just behind the forelegs of the animals and attached thereat to the bellyband, diverge and pass rearwardly and upwardly to the junction of the hip strap and breeching where they are connected. These side straps thus hang beneath the animal just forwardly of his rear legs and it is a common experience for the animal in kicking or stepping forwardly to throw either rear leg outwardly and over these side straps often with injurious results.

With the above in view it is the main object of my invention to provide a substantially triangular heavy flexible guard piece or sheet designed to attach to the harness side straps and to extend therebetween from front to back so that the animal cannot throw his feet over the strap as described.

Another object is to provide a device of this kind in simple, inexpensive, durable and conveniently used form comprising a triangular sheet of heavy fabric, leather or other flexible material having rolled lateral margins forming tubes or passages to receive the side straps and a heavily reinforced rear wide end margin and short connecting straps secured in the said lateral margins to buckle to the rear ends of the side straps and prevent the sheet from working forwardly on the straps.

With these and other objects in view the invention resides in the novel construction and arrangement of parts as hereinafter fully set forth and claimed, reference being had to the accompanying drawings wherein:

Figure 1 is a perspective view of my invention in use upon a horse and conventional harness which is shown in dotted lines.

Figure 2 is a perspective view of the guard piece, the side straps and parts of adjacent harness members.

Figure 3:
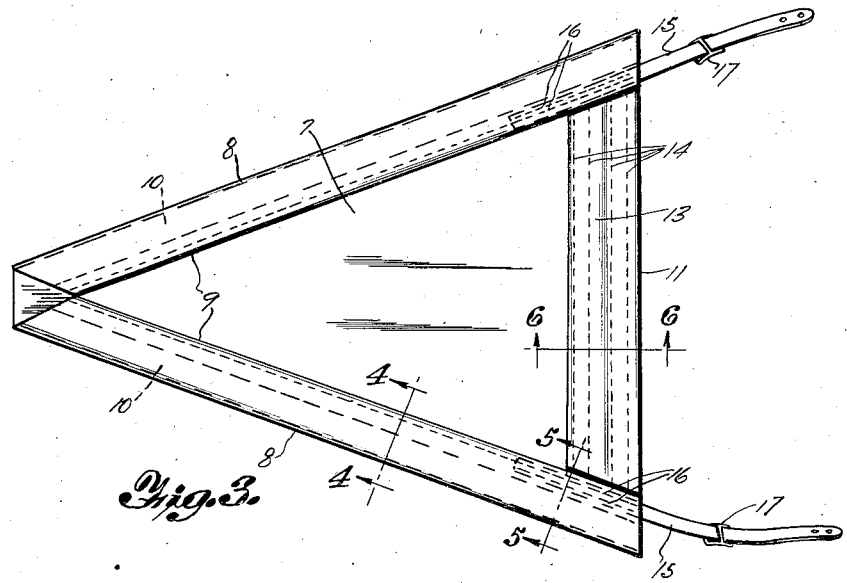
Figure 3 is a plan view of the guard piece alone.
Figure 4:
Figure 5:
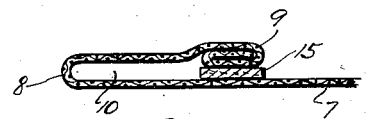
Figure 6:
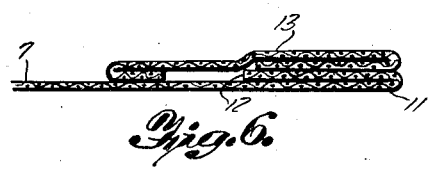

Figures 4, 5 and 6 are enlarged cross sections on the lines 4—4, 5—5 and 6—6 in Figure 3.

Referring now with more particularity to the drawings the reference character A designates generally a conventional form or set of harness including as parts pertinent to this description a bellyband B, hip strap C, breeching D and side straps E which connect these parts by means of snaps F at their ends engaging rings G and H at the bellyband and junction of the hip strap C and breeching D. In conventional manner the side straps E thus extend and diverge from a point just below and behind the forelegs of the horse rearwardly and upwardly along his sides to the hips and the straps thus hang so that the horse may readily become entangled as hereinbefore described. My invention comprises a guard sheet or piece 7 of substantially the shape of an isosceles triangle corresponding to the diverging positions of the side straps E described and formed of any suitable flexible material such as heavy canvas leather or the like. For the sake of coolness the material may be loosely woven or perforated and eyeleted to permit the circulation of air therethrough. However formed the piece 7 has its diverging lateral margins 8 turned inward and folded back on themselves at 9 and sewed along these folds so as to form tubes or passages 10 extending along these margins and opening endwise at the extremities of these margins. Also the wide end margin 11 is folded back at 12 and covered by a marginally folded strip 13 and sewed down as shown at 14 forming a wide stiff hem or fold for strength. Short attaching straps 15 sewed at 16 at their ends beneath the folds 9 of the lateral margins 8 adjacent the wide end 11 and the strips extend free from the corners of the piece with buckles 17 near their free ends as shown.

In use the side straps E are detached from the harness and inserted endwise through the marginal passages 10 of the guard piece 7 with the connected ends of the side straps at the narrow end of the piece. The attaching straps 15 are then passed as shown in Figure 2 through the snaps F and buckled. The side straps are then replaced in their usual positions in the harness and the guard piece 7 covers the space between the straps and hangs free below the body of the horse so that he cannot now step over the side straps as will be readily apparent. All the folds 9, 12 and 13 are disposed upwardly as shown so that no obstruction is formed beneath the guard piece to catch the animal's foot or hoof. The straps 15 prevent the piece from working forwardly and wrinkling and the position and arrangement is such that no hindrance to harnessing or unharnessing is formed by the use of my device.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In combination with a harness set including diverging side straps, a triangular flexible guard piece having lateral passages on its diverging side to receive the said side straps.

2. In combination with a harness set including diverging side straps, a triangular flexible guard piece having lateral passages on its diverging sides to receive the said side straps, and attaching straps at the wider end of the said guard piece fastened to the ends of the side straps.

3. In a harness attachment, a flexible guard piece in the shape of an isosceles triangle, the said piece being folded along its diverging sides to form strap receiving passages, the wide end of the piece being folded and reinforced, and attaching straps sewed in the side folds and extended from the wide end of the guard piece.

HARRY H. BOURN.